(12) United States Patent
Tella et al.

(10) Patent No.: US 7,407,337 B2
(45) Date of Patent: Aug. 5, 2008

(54) CAM-LOCKING POSITIONING MECHANISM

(75) Inventors: Richard P. Tella, Sunnyvale, CA (US); Robert G. Ritter, Los Altos, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/870,215

(22) Filed: Jun. 17, 2004

(65) Prior Publication Data
US 2005/0281613 A1 Dec. 22, 2005

(51) Int. Cl.
G02B 7/02 (2006.01)
G02B 7/04 (2006.01)
G03B 17/14 (2006.01)

(52) U.S. Cl. ............... 403/93; 403/102; 403/109.5; 403/348; 403/350; 348/345; 369/694; 369/699

(58) Field of Classification Search ............ 403/102, 403/109.1, 109.5, 348, 350, 352, 93; 348/345; 359/694, 699–701, 819, 822, 823, 829, 830
See application file for complete search history.

(56) References Cited

U.S. PATENT DOCUMENTS

| | | | | |
|---|---|---|---|---|
| 611,556 A * | 9/1898 | Blanton | ............... | 403/352 |
| 2,284,847 A * | 6/1942 | Raymond | ............... | 403/350 |
| 2,949,692 A * | 8/1960 | Kuhn | ............... | 403/353 |
| 3,319,510 A * | 5/1967 | Rapata | ............... | 411/40 |
| 3,515,418 A * | 6/1970 | Nielsen, Jr. | ............... | 403/352 |
| 3,924,775 A | 12/1975 | Andreaggi | | |
| 4,006,787 A * | 2/1977 | Rumpp et al. | ............... | 403/41 |
| 4,076,437 A * | 2/1978 | Mazzolla | ............... | 403/350 |
| 4,238,164 A * | 12/1980 | Mazzolla | ............... | 403/109.5 |
| 4,785,190 A * | 11/1988 | Frankena | ............... | 403/93 |
| 5,109,572 A * | 5/1992 | Park | ............... | 248/921 |
| 5,267,474 A * | 12/1993 | Ten Hoven | ............... | 403/83 |
| 5,424,873 A * | 6/1995 | Uziie et al. | ............... | 359/819 |
| 5,589,671 A * | 12/1996 | Hackbarth et al. | ............... | 74/527 |
| 5,717,528 A * | 2/1998 | Ihara et al. | ............... | 359/694 |
| 5,719,712 A * | 2/1998 | Ishikawa | ............... | 359/819 |
| 5,851,006 A * | 12/1998 | Spillner et al. | ............... | 74/388 PS |
| 6,761,501 B1 * | 7/2004 | Nakatani | ............... | 403/350 |
| 6,802,328 B2 * | 10/2004 | Lin | ............... | 403/56 |
| 6,979,144 B2 * | 12/2005 | Iwasaki | ............... | 403/359.6 |
| 2002/0089176 A1 * | 7/2002 | Iwasaki | ............... | 285/92 |

FOREIGN PATENT DOCUMENTS

| | | | |
|---|---|---|---|
| GB | 1009354 A | * | 11/1965 |
| JP | 52-62021 | * | 5/1977 |
| JP | 54103021 A | * | 8/1979 |

* cited by examiner

*Primary Examiner*—Daniel P. Stodola
*Assistant Examiner*—Ernesto Garcia
(74) *Attorney, Agent, or Firm*—RatnerPrestia

(57) ABSTRACT

A locking positioning mechanism includes a first element and a second element, the first element and second element rotatable relative to one another about a common rotational axis between a locked orientation and an unlocked orientation and axially translatable relative to one another. The mechanism further includes one or more first locking surfaces of the first element and one or more second locking surfaces of the second element. The second locking surfaces are configured to clear the first locking surfaces in the unlocked orientation. The second locking surface is configured for an interference fit with a first locking surface in the locked orientation.

7 Claims, 4 Drawing Sheets

CAM-LOCKING POSITIONING MECHANISM

BACKGROUND OF THE INVENTION

Many products contain components that are positioned relative to one another during a manufacturing assembly process. However, after initial positioning, it may be desired that these components be held in a fixed relative position. For example, many mobile cameras (those embedded in wireless telephones for instance) have a fixed focal length. Accordingly, the camera modules, e.g., lens assembly components, may be adjustably focused during manufacturing and then are locked for the life of the product.

Current approaches for facilitating adjustment during manufacturing and locking of camera components thereafter include threading a plastic part that holds the lenses into another plastic housing that holds the imaging sensor. The spacing between the lens assembly and the sensor is adjusted by turning the threaded engagement. When correctly positioned, UV cure epoxy is typically used to lock the two plastic parts together. This approach has a number of undesirable attributes, for example: 1) the threaded engagement can generate particles that may contaminate the sensor surface and produce blemishes in the images made by the camera; 2) the curing of the UV-cure epoxy adds cycle time to the manufacturing process; 3) the epoxy impedes rework of modules that are discovered to be out of focus at final test; and 4) the thread tolerances allow for play in the threaded engagement, which can result in relative movement after focus is set, but before UV cure.

BRIEF SUMMARY OF THE INVENTION

In accordance with embodiments of the invention, a locking positioning mechanism having a cam-locking configuration is provided. The mechanism of embodiments of the invention includes a first element and a second element, the first element and second element rotatable relative to one another about a common rotational axis between a locked orientation and an unlocked orientation and axially translatable relative to one another. The mechanism according to embodiments further includes one or more first locking surfaces attached to the first element and one or more second locking surfaces attached to the second element. The second locking surfaces are configured to clear the first locking surfaces in the unlocked orientation sufficiently to facilitate the above-mentioned axial translation. The second locking surfaces are configured for an interference fit with the first locking surfaces in the locked orientation to facilitate fixing the relative translational position of the first and second elements.

In accordance with embodiments of the invention, a method of rotationally and axially reversibly locking a positioning mechanism is provided. The method according to embodiments includes providing a first element having one or more first locking surfaces and a second element having one or more second locking surfaces, and rotating first and second elements relative to one another about a common rotational axis to an unlocked rotational orientation in which first and second elements axially translate freely relative to one another. The method of such embodiments further includes freely translating first and second elements relative to one another to a desired relative translational position, and rotating first and second elements relative to one another to obtain an interference fit between a first locking surface and a second locking surface. The interference fit locks the positioning mechanism rotationally and axially.

DETAILED DESCRIPTION OF THE INVENTION

Figure 1A:
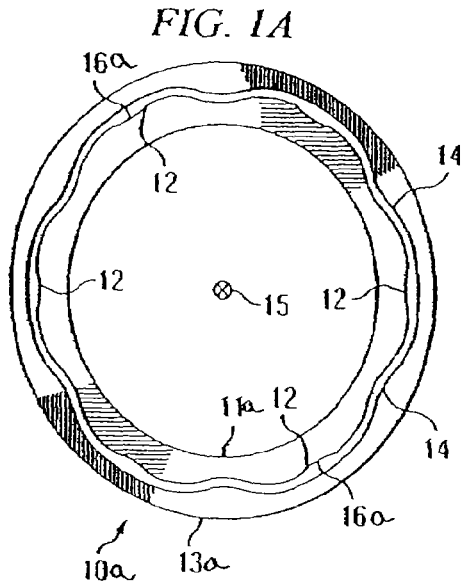
FIG. 1A depicts a cam-locking mechanism including two substantially concentric locking elements with complementary cam surfaces, in accordance with embodiments of the invention.

FIG. 1A depicts cam-locking mechanism 10a including two substantially concentric locking elements 11a and 13a with opposed complementary undulating cam surfaces in accordance with embodiments of the invention. Locking elements 11a and 13a may be made of materials that are elastically deformable, for example, plastics or metals.

Although locking elements may be provided in any number of shapes and configurations according to embodiments of the invention, the locking elements have opposing outer and inner cylindrical faces upon which cam surfaces are disposed for providing locking engagement as described herein. According to the illustrated embodiment, inner locking element 11a has cam surfaces 12 on an outside cylindrical face thereof, and outer locking element 13a has cam surfaces 14 on an inside cylindrical face thereof. Cam surfaces 12 and 14 may be integral portions of respective locking elements 11a and 13a, or may be attached to the respective locking element using any of various techniques existing currently or in the future.

Figure 1C:
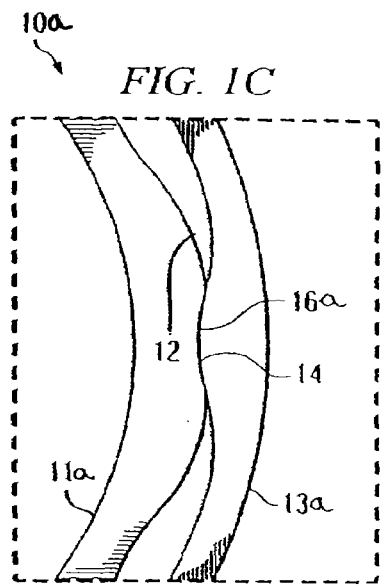
FIG. 1C is a detail view of FIG. 1B showing cam surfaces in the locked orientation.

Cam-locking mechanism 10a of the illustrated embodiment has six cam surfaces 12 and 14 equally spaced circumferentially on each of locking elements 11a and 13a. Other embodiments may have other numbers of cam surfaces, e.g., one or two cam surfaces equally spaced circumferentially on each of the locking elements. Embodiments of the present invention implement three or more cam surfaces in order to provide greater positioning stability. Although the illustrated embodiment includes undulating cam surfaces, other cam surface configurations may be utilized, such as plateau shaped cam surfaces (shown in elements 11f and 13f in FIG. 1F), saw tooth shaped cam surfaces (shown in elements 11g and 13g in FIG. 1G), etc. Moreover, combinations of cam surface configurations may be utilized to provide a locking mechanism having desired attributes. Design trade-offs can be made for example to balance torque to lock, rotation to lock, and both axial and rotational locking strength. Further, various embodiments may include, alternatively, a wedge surface geometry for one or more concentric elements (e.g., elements 11a and 13a).

Inner locking element 11a and outer locking element 13a of the illustrated embodiment share common cylinder axis 15 which is perpendicular to the plane of the figure. That is, inner locking element 11a and outer locking element 13a are disposed coaxially with respect to axis 15. Cam surfaces 12 and 14, each protruding radially from their respective one of inner locking element 11a and outer locking element 13a, present surfaces parallel to cylinder axis 15. Cam surfaces 12 and 14 of the illustrated embodiment form radial ridges or corrugations, shown here having substantially uniform cross-sections. FIG. 1A shows cam-locking mechanism 10a in an unlocked orientation, in which cam surfaces 12 of inner locking element 11a clear cam surfaces 14 of outer locking element 13a sufficiently to allow locking elements 11a and 13a to translate axially relative to one another parallel to cylinder axis 15.

Figure 1B:
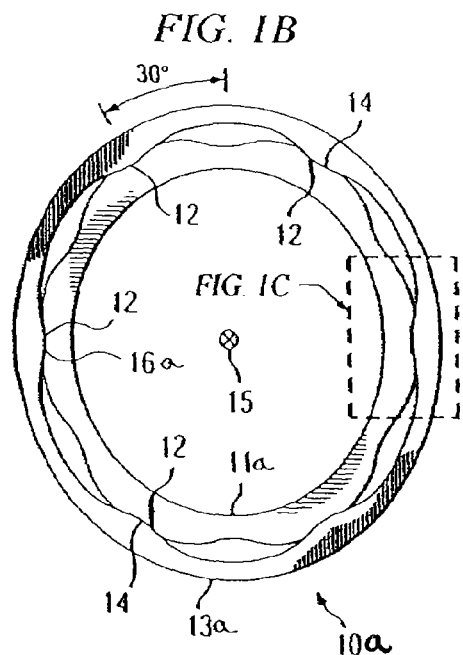
FIG. 1B depicts the cam-locking mechanism of FIG. 1A in a locked orientation.

FIG. 1B depicts cam-locking mechanism 10a in a locked orientation. Specifically, inner locking element 11a and outer locking element 13a have been surfaces 14 to engage corresponding ones of detents 16a (FIG. 1C) formed in cam surfaces 12, thereby discouraging further relative rotational movement of inner locking element 11a relative to outer locking element 13a.

Cam-locking mechanism 10a of the illustrated embodiment may be readjusted axially by unlocking locking elements 11a and 13a through rotation relative to one another about cylinder axis 15, translating their respective axial positions, and again rotating the locking elements to re-lock their relative positions. The interference fit in the locked position prevents relative axial movement between elements 11a and 13a.

FIG. 1C is a detail view of FIG. 1B showing cam surfaces 12 and 14 when cam-locking mechanism 10a is in a locked orientation. When cam-locking mechanism 10a of this particular embodiment is in the locked orientation, cam surfaces 14 on the inner surface of outer locking element 13a rest in detents 16a in cam surfaces 12 on inner locking element 11a. Detents 16a provide an interference fit between inner and outer cam surfaces 12 and 14. Such detents help prevent the cam-locking mechanism from slipping out of the locked orientation and provide positive locking and a stable locked resting relationship between locking elements 11a and 13a.

Detents 16a may be preformed in the surface of cam surfaces 12, such as at a time of manufacture. Although shown formed in cam surfaces 12, it should be appreciated that detents 16a may be formed in cam surfaces 14 of outer locking element 13a in addition to or in the alternative to being formed in cam surfaces 12. It is not necessary for every cam surface 12 and 14 to provide a detent. However, greater positioning stability is obtained by providing three or more detents on equally circumferentially-spaced cam surfaces.

Figure 1D:
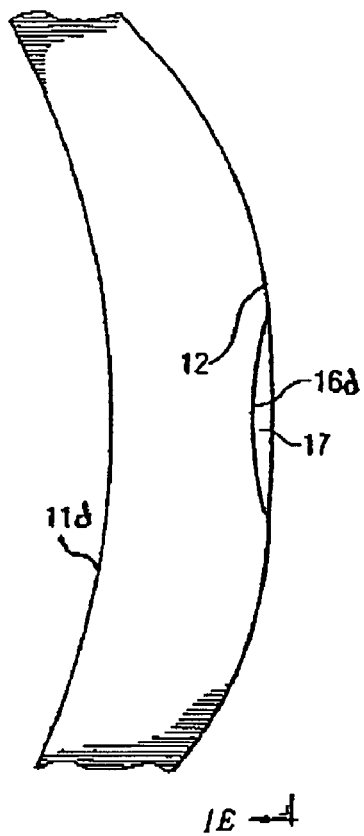
FIGS. 1D and 1E depict a detent of an inner locking element containing additional thin blade structures.
Figure 1E:
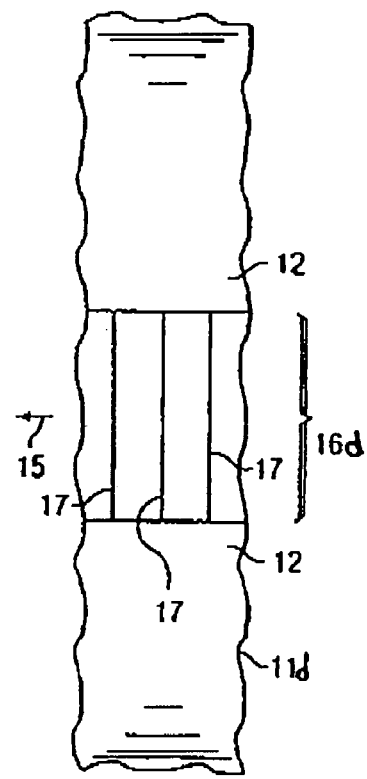
Figure 1F:
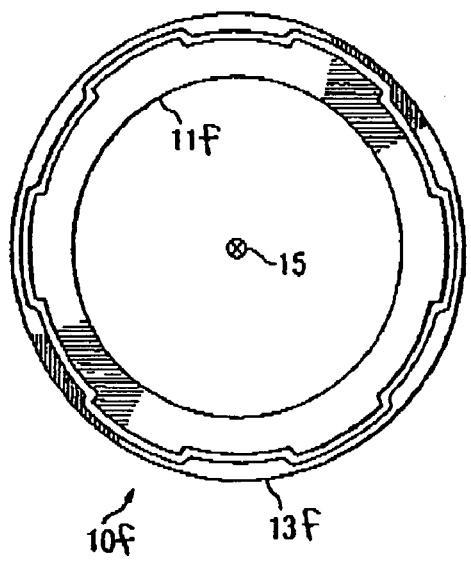
FIGS. 1F and 1G depict alternative embodiment cam surface configurations, including mechanisms 10f and 10g, respectively.
Figure 1G:
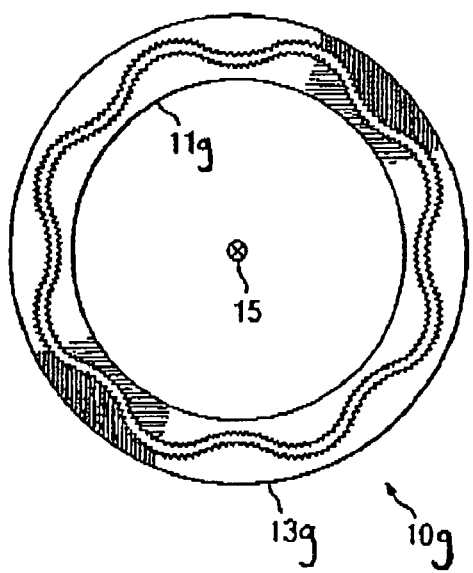

FIGS. 1D and 1E depict detent 16d of inner locking element 11d containing thin blade (or other edge) structures 17. When cam surface 14 of outer locking element 13a (shown in FIGS. 1A, 1B and 1C) is snapped into detent 16d, the blade structures of the illustrated embodiment bite into cam surface 14 of outer locking element 13a, thereby further discouraging relative axial translation of elements 11d and 13a relative to one another. Annular blade structures 17 may alternatively be formed in one or more detents of outer locking element 13a, and may bite into cam surface 12 of inner locking element 11d. The blade structures may be staggered in axial position on circumferentially successive detents. Staggering these blade structures at different axial positions in circumferentially successive detents allows the blade structures to index at least a limited number of times to fresh, undeformed areas of the cam surface when readjusting cam-locking mechanism 10a (shown in FIGS. 1A, 1B and 1C). Additionally or alternatively, grooves may be provided in the cam surfaces of a corresponding locking element, such that the annular blade structures slide within grooves as locking elements 11d and 13a are moved radially with respect to one another.

Figure 1H:
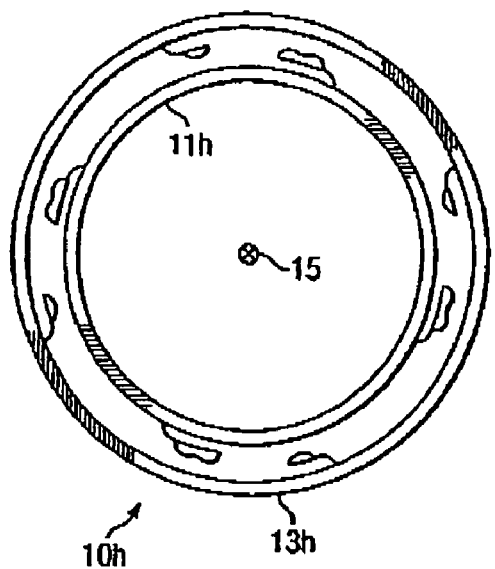
FIGS. 1H and 1I depict alternative embodiments of cam-locking mechanisms of the present invention, including mechanisms 10h and 10i, respectively.
Figure 1I:
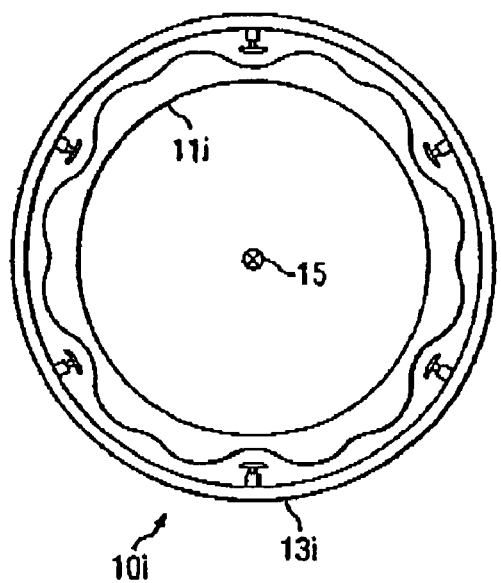

Embodiments of the invention may be configured differently from the configuration depicted in FIGS. 1A-1C. For example, one or both of the elements may support interference fitting surfaces on elastically deformable arms extending radially from concentric surfaces having a common axis of rotation, as shown in elements 11h and 13h in FIG. 1H. One or both concentric elements may have smooth radially telescoping interface extensions that slide both axially and radially with respect to a first locking element (e.g., locking element 11i) and slides radially with respect to a second locking element (e.g., locking element 13i) and which facilitate axial alignment of the locking elements, as shown in elements 11i and 13i in FIG. 1I.

Referring again to FIGS. 1A and 1B, inner locking element 11a of the illustrated embodiment includes an inside circumference into which a component, such as a lens, may be disposed. By disposing a first component, such as a lens, in a fixed position with respect to inner locking element 11a and disposing a second component, such as an optical sensor, in a fixed position with respect to outer locking element 13a (e.g., via a camera housing), adjustment of the relative positions of the first and second components is made through relative translation of the locking elements according to embodiments of the invention. According to one embodiment, inner locking element 11a is translated axially relative to outer locking element 13a to establish a proper focal distance with respect to the lens mounted in element 11a and the optical sensor coupled to element 13a during a manufacturing assembly process. Thereafter, inner locking element 11a is rotated about axis 15 to cause cam surfaces 12 to engage cam surfaces 14 and fix the relative positions of elements 11a and 13a, and thus the relative axial positions of the lens and the optical sensor.

Figure 2:
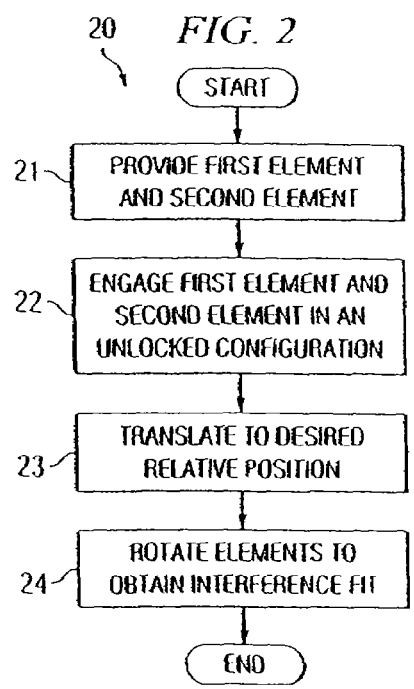
FIG. 2 is a flow diagram illustrating an operational sequence of rotationally and axially reversibly locking a cam-locking mechanism, in accordance with embodiments of the invention.
Figure 3A:
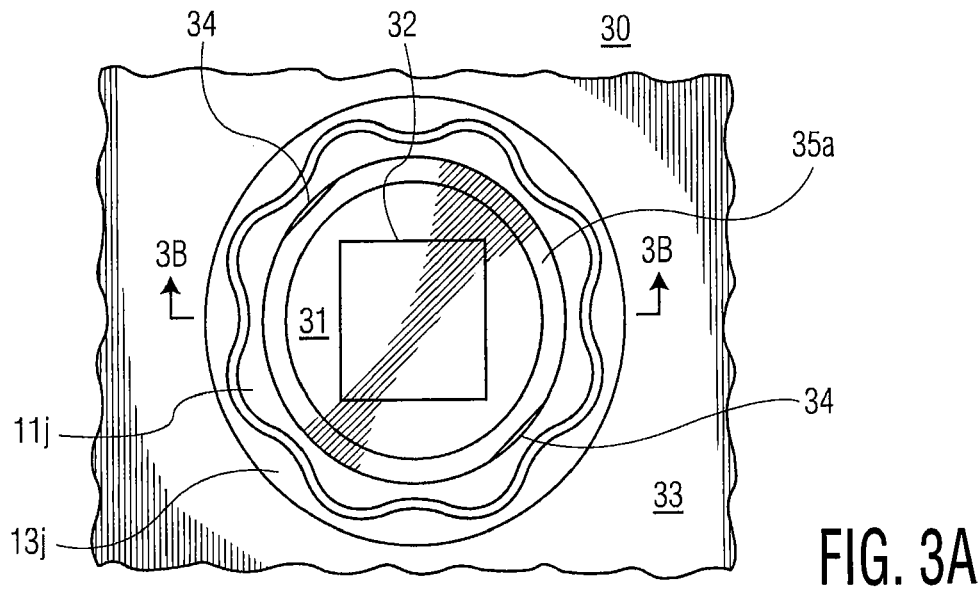
FIGS. 3A and 3B show one embodiment of the locking mechanism for use in a lens adjustment system.
Figure 3B:
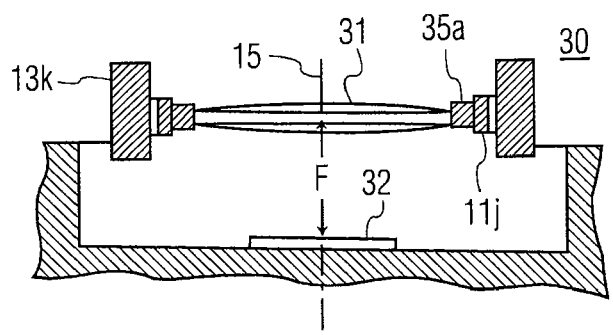
Figure 3C:
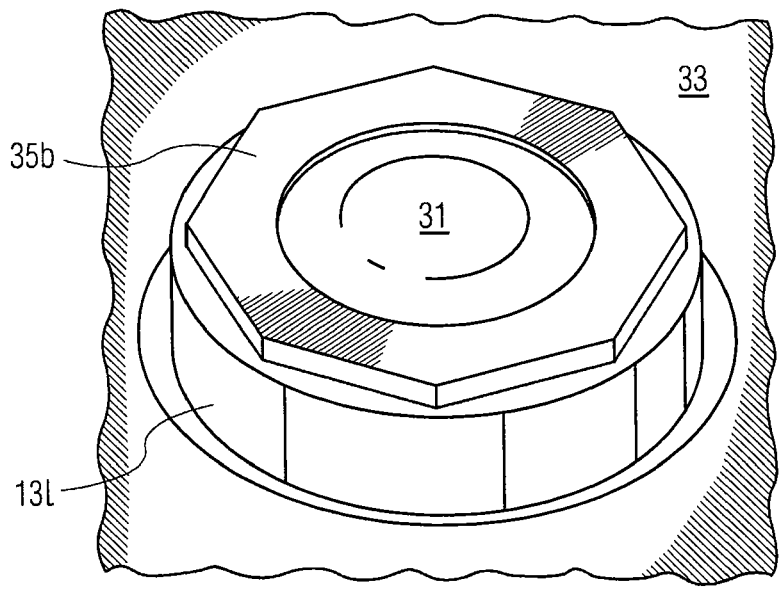
FIG. 3C shows another embodiment of the locking mechanism for use in a lens adjustment system.

FIG. 2 provides a flow diagram illustrating operational sequence 20 of rotationally and axially reversibly locking a cam-locking mechanism, such as mechanism 30 of FIGS. 3A and 3B, in accordance with embodiments of the invention. Cam-locking mechanism 30 of FIG. 3A-3C substantially corresponds to that of FIG. 1A, except that camera components are coupled to the locking elements. Specifically, in the illustrated embodiment of FIGS. 3A and 3B, lens 31 is shown mounted to inner locking element 11j using lens holder 35a and optical sensor 32 is shown coupled to outer locking element 13j in FIG. 3A and 13k in FIG. 3B via camera housing 33. Housing 33 may be part of the body of a camera phone, for example. Lens 31 is shown in FIG. 3C with lens holder 35b coupling the lens to an inner locking element (not visible in the illustration) which is nested inside of outer locking element 13l.

Lens holder 35a of FIG. 3A includes slots 34 for accepting an adjustment tool used in adjustment and locking operations as described herein. Similarly, lens holder 35b of FIG. 3C includes a hexagonal surface arrangement, similar to that used with respect to nuts and other fasteners, for accepting an adjustment tool used in adjustment and locking operations as described herein.

In operation 21, a first element having first locking surfaces (e.g., element 11a) and second element having second locking surfaces (e.g., element 13a) are provided. In operation 22, the first and second elements are engaged with one another in an unlocked configuration in which the first and second elements axially translate freely relative to one another. For example, element 11a and element 13a may be rotated relative to one another about a common rotational axis (axis 15) to an unlocked rotational orientation. In operation 23, the first and second elements are freely translated axially relative to one another to a desired relative axial position. For example, a distance equal to the focal length F of lens 31 may be established between lens 31 and optical sensor 32. In operation 24, the first and second elements are rotated relative to one another to obtain an interference fit between the first locking surfaces (cam surfaces 12) and the second locking surfaces (cam surfaces 14). This interference fit locks the cam-locking mechanism both rotationally and axially.

It is envisioned that cam-locking mechanisms (e.g., 10a, 30) will typically be employed automatically using rotating and translating machinery. Alternatively, elements (e.g., 11a and 13a) may be rotated and translated relative to one another simply by gripping and twisting the elements manually, or by employing tooling having varying degrees of complexity. The use of machinery or tooling may discourage undesired manual post-assembly tampering.

Although embodiments of the invention have been described herein with respect to use in positioning and aligning lenses, for example fixed-focus lenses for cameras (e.g., digital cameras embedded in wireless telephones or film cameras such as those provided as disposable or "one-time-use" cameras), the concepts of the present invention have applicability in any number of situations.

From the above, it can be readily appreciated that embodiments of the invention address various undesirable attributes in the traditional design and associated assembly process. In particular, embodiments of the invention provide a locking mechanism which does not require adhesives to provide locking of components in a desired relative position, and thus do not require increased cycle times to accommodate curing or special handling of adhesive chemicals. Moreover, locking mechanisms of embodiments of the invention, although providing a fixed engagement of components sufficient to maintain relative positions of components throughout the useful life of a product, are reversible to facilitate rework of modules that are discovered to be improper relative positions, such as at final product testing. Embodiments of the present invention provide a locking mechanism in which locking engagement is less likely to generate particles that may contaminate a sensor surface and produce blemishes in the images made by a camera in which the mechanism is utilized. The locking mechanisms of embodiments provide for fixing of components in desired relative positions substantially without play which can result in relative movement after engagement of the locking mechanism.

What is claimed is:

1. A locking positioning mechanism, comprising:
   a pair of concentric locking elements, said elements being free to move axially with respect to each other when in a non-locked orientation;
   an outer surface of an inner one of said concentric locking elements having a cam surface geometry; and
   an inner surface of an outer one of said concentric locking elements having a cam surface geometry complementary to said cam surface geometry of said inner concentric element, said inner surface and said outer surface rotatable with respect to one another into a locking engagement,
   wherein said cam surface geometry of at least one of said concentric locking elements comprises an undulating surface geometry,
   and wherein the cam surface geometry of at least one of said concentric locking elements comprises at least one detent and a blade structure is disposed in the at least one detent.

2. The mechanism of claim 1 the detent is a preformed detent operable to engage a surface of said cam surface geometry of the other one of said concentric locking elements.

3. The mechanism of claim 1 wherein at least one of said cam surfaces is constructed from deformable material.

4. A locking positioning mechanism, comprising:
   a first locking element and a second locking element, said first locking element and said second locking element rotatable relative to one another about a common rotational axis between a locked orientation and an unlocked orientation, said first locking element and said second locking element axially translatable relative to one another when in said unlocked orientation, said first locking element comprising first locking surfaces, and said second locking element comprising second locking surfaces, said second locking surfaces configured to clear said first locking surfaces in said unlocked orientation, said second locking surfaces configured for an interference fit with said first locking surfaces in said locked orientation
   wherein at least one of said first and said second locking surfaces comprises a detent including a blade structure disposed in said detent to bite into the other locking surfaces thereby discouraging relative axial translation of the first locking element and the second locking element.

5. The mechanism of claim 4 wherein said first and second locking elements are cylindrical.

6. The mechanism of claim 4 wherein a plurality of said blade structures are axially variably positioned.

7. The mechanism of claim 4 wherein said first locking element is coupled to lens via a lens holder and said second locking element is coupled to an optical sensor via a camera housing.

* * * * *

UNITED STATES PATENT AND TRADEMARK OFFICE
CERTIFICATE OF CORRECTION

PATENT NO.       : 7,407,337 B2                                   Page 1 of 1
APPLICATION NO.  : 10/870215
DATED            : August 5, 2008
INVENTOR(S)      : Tella et al.

It is certified that error appears in the above-identified patent and that said Letters Patent is hereby corrected as shown below:

In column 6, line 46, in Claim 7, delete "to lens" and insert -- to a lens --, therefor.

Signed and Sealed this

Seventh Day of October, 2008

JON W. DUDAS
*Director of the United States Patent and Trademark Office*